United States Patent [19]

Asano et al.

[11] Patent Number: 4,505,568
[45] Date of Patent: Mar. 19, 1985

[54] SHUTTER MECHANISM FOR CAMERA

[75] Inventors: Seiji Asano; Takashi Kagechika; Minoru Ishiguro, all of Saitama, Japan

[73] Assignee: Fuji Photo Optical Co., Ltd., Saitama, Japan

[21] Appl. No.: 525,817

[22] Filed: Aug. 23, 1983

[30] Foreign Application Priority Data

Aug. 27, 1982 [JP] Japan .................. 57-148881

[51] Int. Cl.³ ............................................. G03B 9/08
[52] U.S. Cl. .................. 354/458; 354/234.1
[58] Field of Search ........... 354/458, 234.1, 267.1, 354/456, 252, 258.1

[56] References Cited

U.S. PATENT DOCUMENTS 4,338,014 7/1982 Yoshida et al. ............ 354/234.1

Primary Examiner—L. T. Hix
Assistant Examiner—David M. Gray
Attorney, Agent, or Firm—Young & Thompson

[57] ABSTRACT

A shutter mechanism for a camera comprises at least one shutter blade, an electromagnet for holding the shutter blade in a blocking position where an exposure aperture is concealed and another electromagnet for returning the shutter blade to the initial and blocking position. The holding electromagnet is energized in association with the shutter actuating operation to permit the shutter blade to move, initiating exposure. The shutter blade in the course of movement to an unblocking position is forced to be returned to the initial and blocking position by the returning electromagnet when the latter is energized and the held therein by the holding electromagnet which has been deenergized, terminating exposure.

8 Claims, 7 Drawing Figures

SHUTTER MECHANISM FOR CAMERA

BACKGROUND OF THE INVENTION

The present invention relates to a shutter mechanism for cameras and, more particularly to a shutter mechanism of the type having at least one shutter blade urged by a spring and two electromagnetic means by which the shutter blade is held in and is returned to its blocking position.

Investigations from the standpoint of miniaturizing cameras without distinctions as to cameras equipped with either lens shutters or focal plane shutters has been carried out. In a miniature camera of the type having a lens shutter it is one of the leading features of camera sysytems to provide shuck such a camera with a motor powered film winding mechanism, a flash illumination unit and/or an automatic focusing apparatus built therein and thus, it has become one of essential aims in camera design to reduce the number of camera parts in order to provide miniturized cameras with various functions available. With these points as background, constructions including a shutter mechanism have been greatly simplified. However, there is much room for further improvement. For example, in conventional typical electrically controlled shutter mechanisms, an opening shutter blade is brought into engagement with a mechanical cocking member by a film transport mechanism against the force of spring means by which the opening shutter is urged toward unlocking position in which an exposure aperture is opened and thereby, held in its blocking position. When a shutter release member permits the cocking member to disengage with the opening blade, the latter is caused to move to its unblocking position to initiate exposure. At the same time, a retarding means which takes the form of electromagnetic means is actuated to retard a closing shutter blade in its unblocking position. Immediately after an exposure time automatically selected by an exposure control circuit, the retarding means is deactuated to cause the closing blade to move to its blocking position, resulting in the termination of exposure.

One of the problems associated with the shutter mechanism above described is concerned with a self-cocking mechanism by which a tension spring is urged to cause a shutter blade to move as well as to cause the loaded film to be moved by one frame. The provision of such self-cocking mechanism makes cameras bulk, due to the number of camera parts. Furthermore, if a camera with a motor powered film winding mechanism built therein is subjected to a self-cocking function, there is a disadvantage that too much load is put on the motor which is powered by a battery with a limited capacity.

On the other hand, there has been proposed another shutter mechanism of the type having electromagnetic means such as a solenoid for opening and closing the shutter. Although this type of shutter is favorable in view of its simplified mechanical linkage and the reduced number of camera parts, there still remains the disadvantage that it is required to supply too much electric energy to the electromagnetic means, or to scale up or specialize the shape of the electromagnetic means because of the fact that the shutter is to be caused to instantaneously open and close by great electromagnetic driving force. This is also disadvantageous in view of battery capacity, compactness and cost.

SUMMARY OF THE INVENTION

It is therefore the primary object of the present invention to provide a shutter mechanism which comprises a reduced number of parts, so as to be significantly simplified in structure and to be thereby locatable in a small space.

It is another object of the present invention to provide a shutter mechanism which is controlled by electromagnetic means consuming very little electricity.

It is still another object of the present invention to provide a shutter mechanism whose a shutter blade can be smoothly released.

It is a further object the present invention to provide a shutter mechanism which includes an electromagnetic means having a plunger which is prevented from inclination under the influence of rotational movement of a shutter blade.

In accomplishing these and other objects, according to preferred embodiments of the present invention, there is provided a shutter blade which is urged by a biasing spring so as to move to an unblocking position thereby permitting exposure. The spring urged shutter blade is held by an electromagnetic means in a blocking position thereby concealing an exposure aperture. On the other hand, the spring urged shutter blade moved to an unblocking position is returned by another electromagnetic means to its initial and blocking position so as to terminate exposure. Such shutter mechanism of which the motion for initiating and terminating exposure is controlled by two electromagnetic means can provide a significantly simplified shutter with a reduced number of parts.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
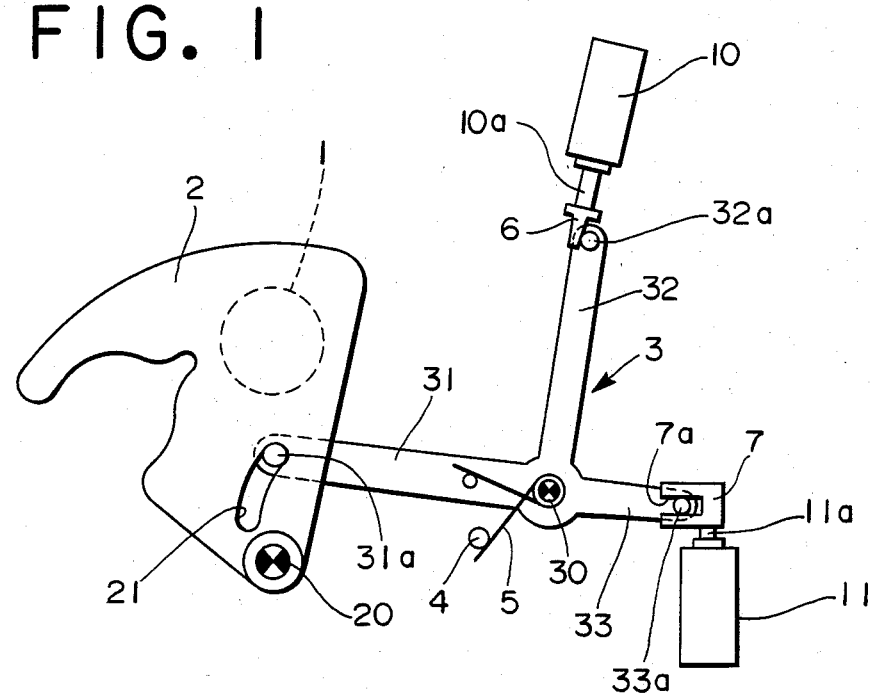
FIG. 1 is a schematic elevation of a shutter mechanism embodying the present invention.

Before the description of the present invention proceeds, it is to be noted that like parts are designated by like reference numerals and symbols throughout several views of the accompanying drawings.

Figure 2:
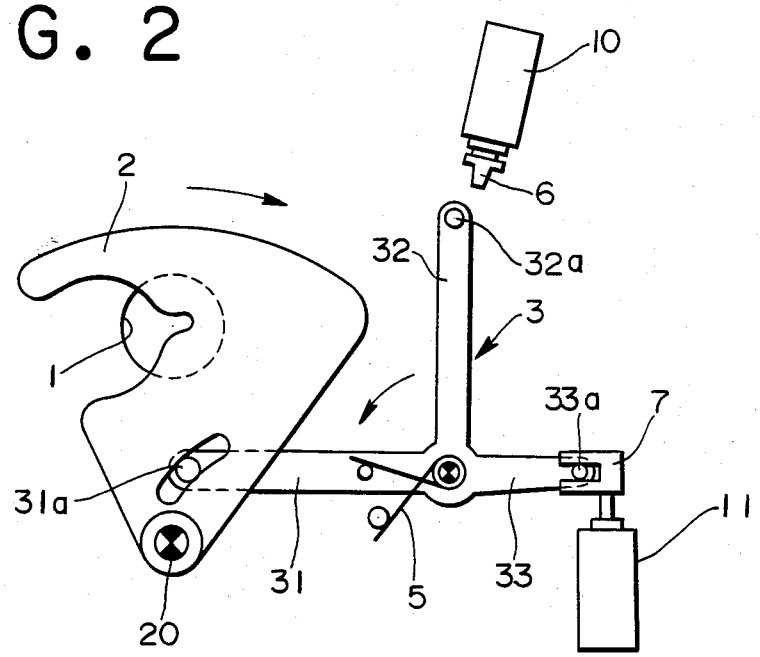
FIG. 2 is a schematic elevation of the shutter mechanism of FIG. 1, which is in an operated state.

In FIGS. 1 and 2, there are shown in a simple environment a preferred embodiment of a shutter mechanism in accordance with the present invention in a blocking and an unblocking position, respectively. herein, it is to be noted that the term "blocking" position means a position where a shutter blade conceals an exposure aperture of camera and the term "unblocking"

position means a position where the shutter blade can permit scene light to pass through the exposure aperture. The shutter mechanism includes a shutter blade 2 and an actuating member 3 which may take the form of a three-armed lever and is pivotably mounted on a shaft 30. The shutter blade 2 of the form of a single planar opaque sector blade which is provided with an opening is pivotably mounted on a shaft 20 so as to be reciprocable or oscillate between a blocking and an unblocking position. In the blocking position shown in FIG. 1 an exposure aperture 1 formed in a part of the camera body which in shown by the dotted line is fully concealed by the shutter blade 2. In the unblocking position, the shutter blade 2 permits exposing film because the opening formed in the shutter blade 2 that intersects the optical axis of the camera is varied in accordance with the level of scene brightness. The shutter blade 2 contains an arcuate slot 21 engaged by a pin 31a fixedly mounted on one arm 31 of the three-armed actuating lever 3 which is urged by a spring 5 so as to rotate counterclockwise. Located opposite to other two arms 32, 33 of the three-armed actuating lever 3, each having a pin 32a, 33a at its end, are holding and returning means taking the form of an electromagnetic device comprising, for instance, solenoid and plunger. The holding means comprises a solenoid 10 and a plunger 10a which is normally urged by a spring, not shown, to protrude from the solenoid 10 so as to engage with the pin 32a fixedly mounted on the arm 32 of the actuating lever 3 at its top end 6 and which is cause to retract into the solenoid 10, disengaging with the pin 32a to permit the rotational movement of the actuating lever 3 counterclockwise under the influence of biasing spring 5, as the solenoid 10 is energized. As a result of the rotational movement of the actuating lever 3, the shutter blade 2 is caused to move to an unblocking position because of the pin-slot engagement 21, 31a. At this time, the arm 33 of the actuating lever 3 with the pin 33a engaged with a hooked end 7 of the plunger 11a of the other electromagnetic means brings the plunger 11a out of the solenoid 11. The energization of the solenoid 11 immediately causes the plunger 11a to retract into the solenoid 11, so that the shutter blade 2 in the course of movement is returned to its blocking position so as to terminate an exposure. As is apparent from the shape of the opening formed in the shutter blade 2 of this embodiment, the shutter thus controlled by the electromagnetic means can fully perform properly program controlled exposure. In this case, the level of scene brightness is directly measured by a photo-electric element located, for instance, behind the exposure aperture 1.

The operation of the above mentioned shutter mechanism is described with reference to the time chart shown in FIG. 3. When a shutter actuating signal is produced, the solenoid 10 is energized to retract the plunger 10a, causing the top end 6 to disengage with the pin 32a mounted on the arm 32 of the actuating lever 3, so that the actuating lever 3 is allowed to rotate counterclockwise under the influence of the force of the spring 5. The rotation of the actuating lever 3 causes the shutter blade 2 to rotate clockwise through the pin-slot engagement with the opening 1 being gradually unblocked as shown in FIG. 2 so as to initiate exposure. When a proper amount of light to which the film is exposed is measured, the solenoid 11 is energized to immediately retract its plunger 11a, so as to rotate the actuating lever 3 clockwise against the spring 5. As a result of, the shutter blade 2 is returned to its blocking position to terminate exposure. After a predetermined time from the energization of the solenoid 11, the solenoid 10 is deenergized to permit the plunger 10a to protrude under the influence of the force of its spring, thereby to engage the top end 6 of the plunger 10a with the pin 32a on the arm 32 of the actuating lever 3. As the solenoid 11 is deenergized after a proper time, the shutter mechanism is brought into its initial state. A spring support member 4 can serves a stopper for preventing an excessive rotation of the actuating lever 3. In this embodiment, it is enough for obtaining a programmed shutter to provide only several parts such as a single shutter blade 2, a three-armed actuating lever 3, a spring 5 and two electromagnetic means all of which can be located on a common base plate, resulting in a reduced size and a favorable manufacturing.

Figure 4:
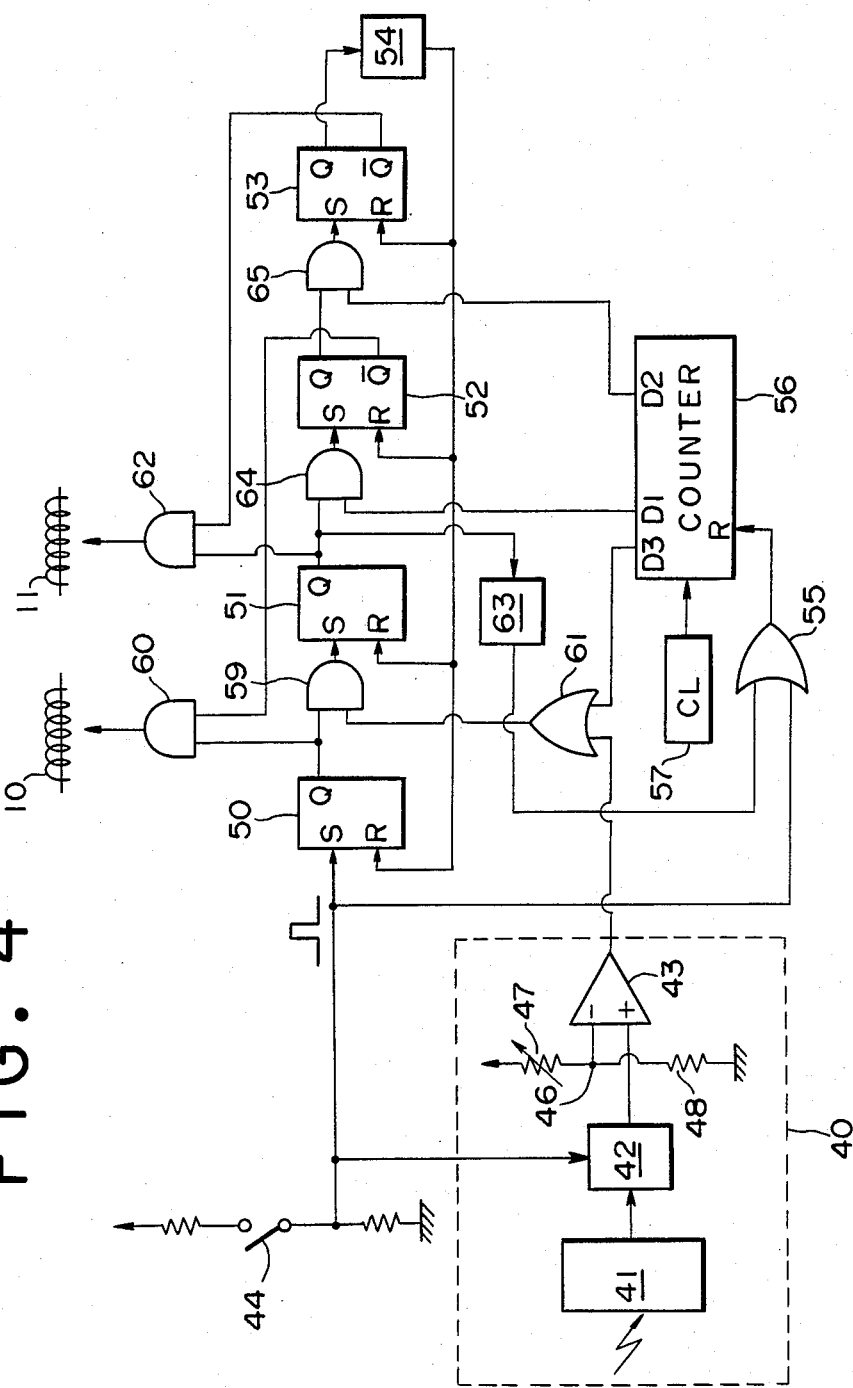
FIG. 4 is a control circuit for the shutter mechanism of FIG. 1.

In FIG. 4, there is shown an exposure control circuit 40 which is adapted to control shutter speed in accordance with the level of scene brightness and includes a photometric circuit 40, an integration circuit 42 and a comparator 43. The photometric circuit 41 provides an electric output signal in accordance with the level of scene brightness by receiving a part of the light passing through a taking lens (not shown). The output signal from the photometric circuit 41 is put in and integrated by the integration circuit 42 when the latter receives a shutter actuating signal 45 from a switch 44 which is turned on in association with the operation of a shutter actuating member (not shown). In the comparator 43, the integrated output signal is compared with the voltage present at a connection point 46, a signal at high level (H) is produced when the integrated output signal is higher than the voltage at the connection points 46. The voltage present at the connection point 46 is adjusted in accordance with the resistance ratio between resistances of a fixed and a variable resistance 48 and 47, the variable resistance being adjustable in accordance with film speed.

The flip-flop circuits 50 to 53 are adapted to be resettable by a signal from a differential circuit 54. The shutter actuating signal 45 is directed to the setting terminal S of the flip-flop circuit 50 so as to provide a high level of signal ("H" level signal) at its output terminal. Simultaneously, the shutter actuating signal 45 is directed to and resets a counter means 56 through an OR circuit 55 so as to initiate counting clock pulses from a pulse generator 57. An AND circuit 59 to which "H" level output signal from the flip-flop circuit 50 is directed does not set the flip-flop circuit 51 because of the presence of a low level of signal ("L" level signal) at its other input terminal. As the flip-flop circuit 51 is in reset state, the flip-flop circuit 52 is kept in reset state, so as to provide a "H" level signal at its output terminal $\overline{Q}$ and direct it to an AND circuit 60. At the same time the flip-flop circuit 50 is brought into its set state, the AND circuit 60 provides a "H" level signal which, in turn, is directed to and then energizes the solenoid 10. It is preferable to dispose a driver between the solenoid 10 and AND circuit 60 if the solenoid 10 consumes too much electricity. Charging the solenoid 10 with electricity, the shutter blade 2 is caused to move for exposure. In the exposure, at the time the comparator 43 provides a "H" level signal, the OR circuit 61 provides a "H" level signal which, in turn, is directed to and operates to cause the AND circuit 59 to produce a "H" level signal so as to set the flip-flop circuit 51. At the moment the flip-flop circuit 51 is set, the output from the AND circuit 62 turns to "H" level, energizing the solenoid 11 so as to cause the shutter blade 2 to close.

In the set state of the flip-flop circuit 51, the differentiating circuit 63 produces a differential signal which, in turn, is directed through an OR circuit to and then resets the counter 56. When the counter 56, which has started to count a clock pulse, counts the number "N1" of pulses, that is, the time "T1" shown in FIG. 3 is elapsed, the counter 56 then provides a "H" level signal at the terminal D1 which causes the AND circuit 64 to produce a "H" level signal, reversing the flip-flop circuit 52 to cause the latter to be in its set state and thereby causing the AND circuit 60 to provide a "L" level signal so as to deenergize the solenoid 10.

Figure 3:
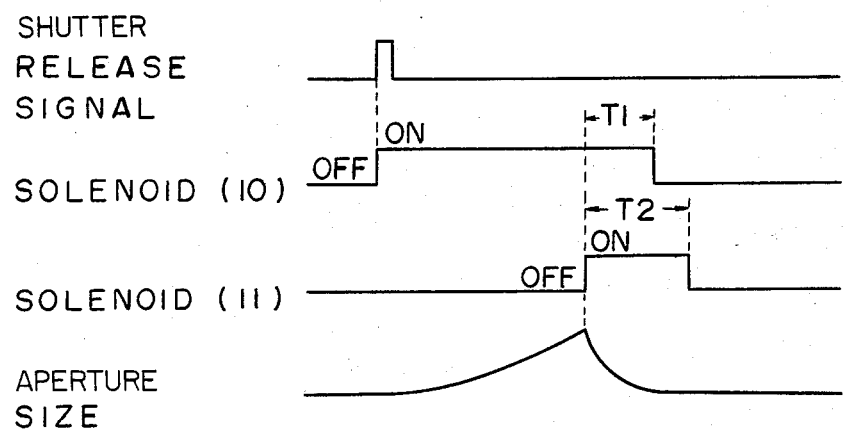
FIG. 3 is a time chart showing the operation of the shutter mechanism of FIG. 1.

Furthermore, with the number "N2" of clock pulses counted, that is, the time "T2" (T2>T1) elapsed shown in FIG. 3, the counter 56 then provides a "H" level signal at the terminal D2 which causes the AND circuit 65 provide a "H" level signal, reversing the flip-flop circuit 53 to be in set state. This reversed flip-flop circuit 53 presents a "L" level signal so as to deenergize the solenoid 11.

The shutter mechanism is so designated that the OR circuit 61 receives a "H" level signal to cause the shutter blade to move to its blocking and initial position after the time "T3" is elapsed from when the counter 56 is reset by the shutter actuating signal. The time "T3" which permits a maximum long time exposure, is given for the purpose of preventing unnecessarily excessive exposure in which various problems, for instance, blurring are encountered.

Figure 5:
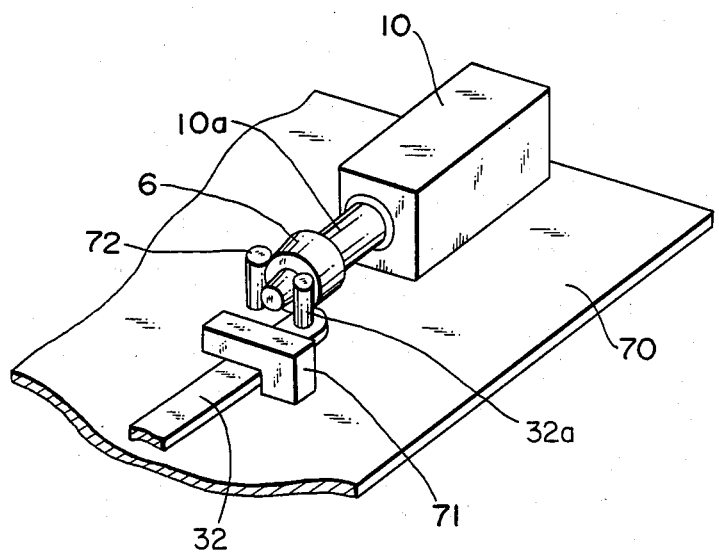
FIG. 5 is a perspective illustration of an example of a solenoid used in the shutter mechanism of FIG. 1.

In FIG. 5 shows a definite example of the holding means of the shutter mechanism above mentioned. Fixedly located on a base plate 70 which is fixedly mounted on a part of camera body are the solenoid 10, a stop member for restricting an excessive protrusion of the plunger 10a and a pin 72 for preventing the plunger 10a from lateral motion. As previously mentioned, the actuating lever 3 is so urged by the tension spring 5 as to move counterclockwise. In the state of the shutter mechanism shown in FIG. 5, the solenoid 10 is deenergized to permit the protrusion of the plunger 10, resulting in that the top end 6 at the distal end of the plunger 10a is brought into engagement with the pin 32a fixedly mounted on the arm 32 of the actuating lever 3 to restrict counterclockwise rotational movement of the actuating lever 3 and thereby to hold the shutter blade 2 in its blocking position. In such a condition, the plunger 10a has a tendency to move laterally to the left in the drawing under the influence of the force of the spring 5 through the pin 31a abutting against the side surface of the top end 6. But if the plunger 10 moves laterally, its operation is impaired. For this reason, there is provided with a pin 72 on the base plate 70, which is adapted to abut against the top end at its tapered side surface so as to prevent the lateral motion of the plunger 10 and to retract the plunger 10a without frictional force from the pin 72.

The fact that the shutter mechanism mentioned above is so constructed that the shutter blade is urged toward its unblocking position results in such advantages that, for instance, the shutter blade 2 can be brought into and maintained in its marginal unblocking or fully opened position by only manually pushing the plunger 10a against the spring without energizing the solenoid 10.

As is apparent from the above description, the shutter mechanism of this invention in which the shutter blade 2 can be maintained in its marginal or fully opened unblocking position without using electric energy favorably permits, for instance a long time exposure. Therefore, when a time exposure is desired, it is enough only to push the plunger by means of a member for initiating exposure, causing the shutter blade 2 to move toward its unblocking position. It should be noted that the plunger 10a is, of course, necessarily returned to the protruding position after the shutter has moved. After a predetermined time has elapsed, the operation of the shutter actuating member permits the shutter blade 2 to return to its initial and blocking position in conformity to the time chart shown in FIG. 3 so as to terminate exposure. By providing a time exposure establishing means which makes the solenoid operate only one time upon a first depression of the shutter actuating member, it becomes possible to perform time exposure by the shutter actuating member only.

Figure 6:
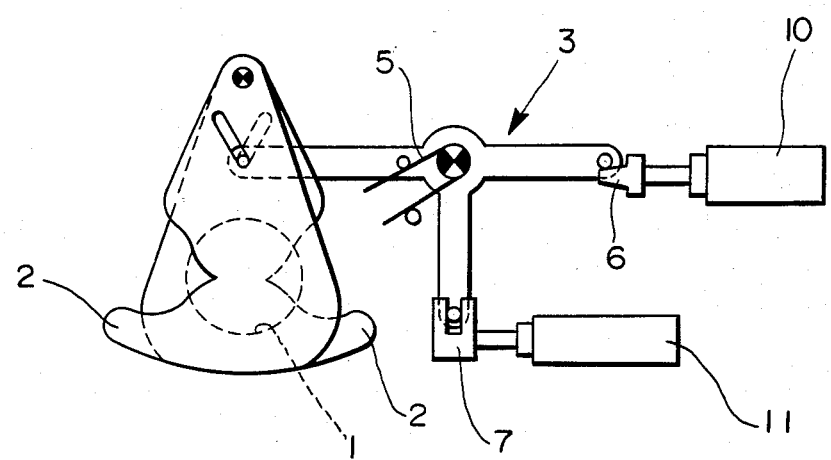
FIG. 6 is a schematic elevation of another shutter mechanism embodying the present invention.
Figure 7:
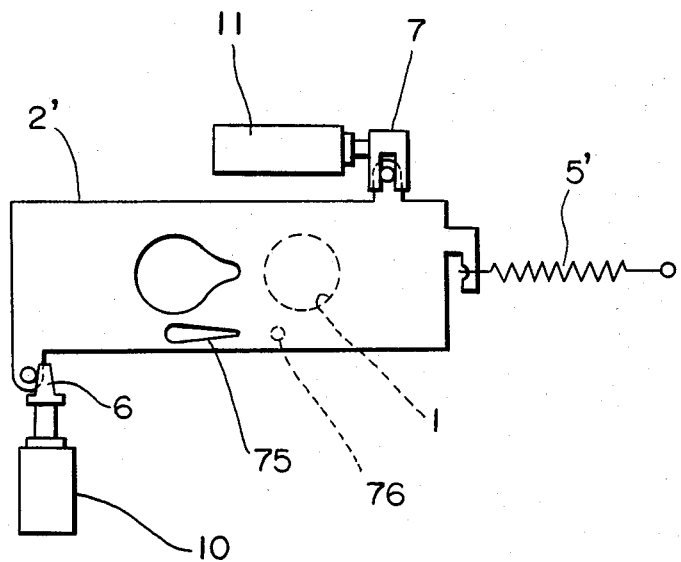
FIG. 7 is a schematic elevation of still another shutter mechanism embodying the present invention.

FIGS. 6 and 7 shows other embodiments of a shutter mechanism in accordance with the present invention. The shutter mechanism shown in FIG. 6 is of the type having double shutter blades 2 well known in the art and two electromagnetic means 10 and 11 located parallel to each other. Such parallel location of the electromagnetic means results in top and bottom space saving to some extent. On the other hand, the shutter mechanism shown in FIG. 7 is of the type having a single shutter blade 2' slidably mounted and urged to the right, that is, toward the unblocking position by a tension spring 5'. This construction can eliminate the provision of an actuating lever like the three-armed lever used in the previous embodiment shown in FIGS. 1 and 2. It should be noted that a double shutter plate construction well known in the art may be available in this embodiment. In FIG. 7 an opening 75 formed in the shutter plate 2' is an aperture stop for gradually exposing a photoelectric element 76 located behind the shutter plate to scene light, so as to measure scene brightness.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be constructed as included therein.

What is claimed is:

1. A shutter mechanism of the type having at least a shutter blade movable between a blocking and an unblocking position, said shutter mechanism comprising:
   a biasing spring for urging said shutter blade toward said unblocking position;
   first electromagnetic means for holding said shutter in said blocking position which, upon the energization thereof, permits said shutter blade urged by said biasing spring to move to said unblocking position;
   second electromagnetic means for returning said shutter blade in the course of said movement thereof to said blocking position; and
   control means for controlling the energization of said first and second electromagnetic means, said control means performing the following steps in order:
   (1) energizing said first electromagnetic means in response to a shutter release operation;
   (2) energizing said second electromagnetic means upon receiving a signal for terminating exposure;
   (3) deenergizing said first electromagnetic means after said energization of said second electromagnetic means; and (4) deenergizing said second electromagnetic means after said deenergization of said first electromagnetic means.

2. A shutter mechanism as defined in claim 1, said second electromagnetic means being a solenoid.

3. A shutter mechanism as defined in claim 2, said solenoid having a plunger with its end operatively coupled to said shutter blade.

4. A shutter mechanism as defined in claim 2, said first electromagnetic means being a solenoid.

5. A shutter mechanism as defined in claim 4, further comprising a rotatable actuating lever with its one end operatively coupled to said shutter blade, said rotatable actuating lever being urged by said biasing spring.

6. A shutter mechanism as defined in claim 5, each of said first and second solenoids having a plunger, said actuating lever having three arms of which the first is operatively coupled to said shutter blade, the second is engageable with said plunger of said first solenoid and the third is coupled to said plunger of said second solenoid.

7. A shutter mechanism as defined in claim 6, said plunger of said first solenoid having a conical tip at its distal end of which the side surface is abuttable against a pin fixedly mounted on said second arm of said actuating lever so as to prevent said plunger from moving laterally.

8. A shutter mechanism as defined in claim 4, said control means comprising:
a first flip-flop circuit adapted to be set in response to a shutter actuating operation;
a first AND circuit to which a signal from the Q terminal of said first flip-flop circuit and said exposure terminating signal are applied;
a second flip-flop circuit which is set by a signal from said first AND circuit;
a counter adapted to be reset by a signal provided at Q terminal of said second flip-flop circuit for counting clock pulses;
a second AND circuit which is opened to transfer a signal from said second flip-flop circuit upon the number N1 of clock pulses counted by said counter;
a third flip-flop circuit adapted to be set by a signal from said second AND circuit;
a third AND circuit which is opened to transfer a signal from third flip-flop circuit upon the number N2 (N2>N1) of clock pulses counted said counter;
a fourth flip-flop circuit adapted to be set by a signal from said third AND circuit;
a fourth AND circuit with its input terminals connected to a Q terminal of said first flip-flop circuit and a $\overline{Q}$ terminal of said third flip-flop circuit, respectively, for energizing said first solenoid during a high level signal provided at the output terminal thereof; and
a fifth AND circuit with its input terminals connected to a Q terminal of said second flip-flop circuit and a $\overline{Q}$ terminal of said third flip-flop circuit, respectively, for energizing said second solenoid during a high level of signal provided at the output terminals thereof.

* * * * *